May 16, 1961  R. E. TROST  2,984,710
DICTATING MACHINE
Filed Aug. 23, 1957  5 Sheets-Sheet 1
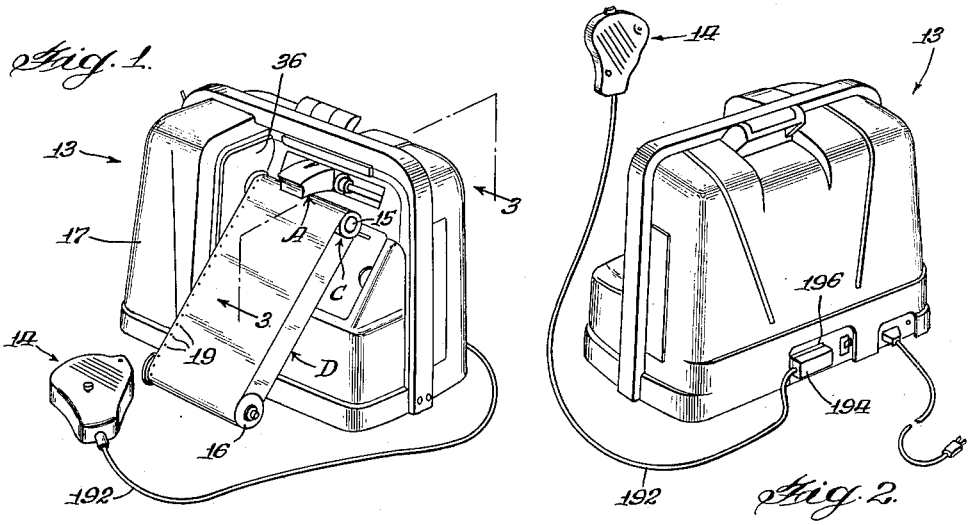
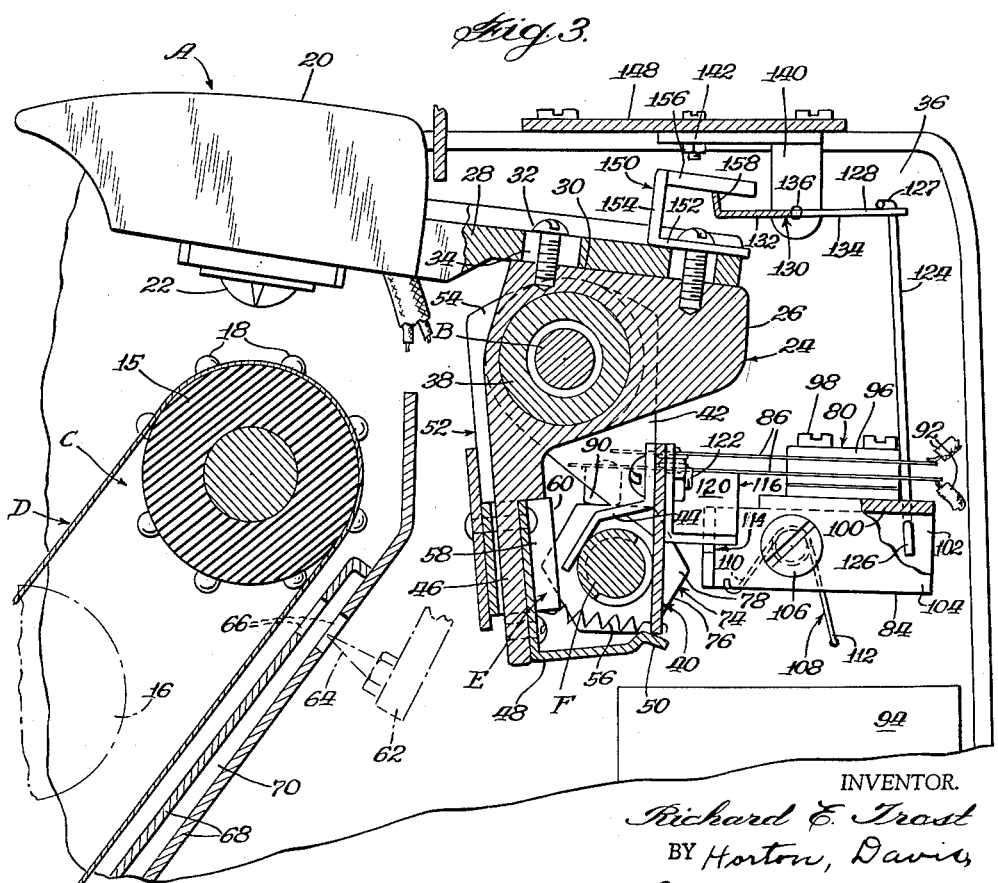
INVENTOR.
Richard E. Trost
BY Horton, Davis,
Brewer & Brugman
Attys May 16, 1961  R. E. TROST  2,984,710
DICTATING MACHINE
Filed Aug. 23, 1957  5 Sheets-Sheet 2

INVENTOR.
Richard E. Trost
BY Horton, Davis,
Brewer & Brugman
Attys.

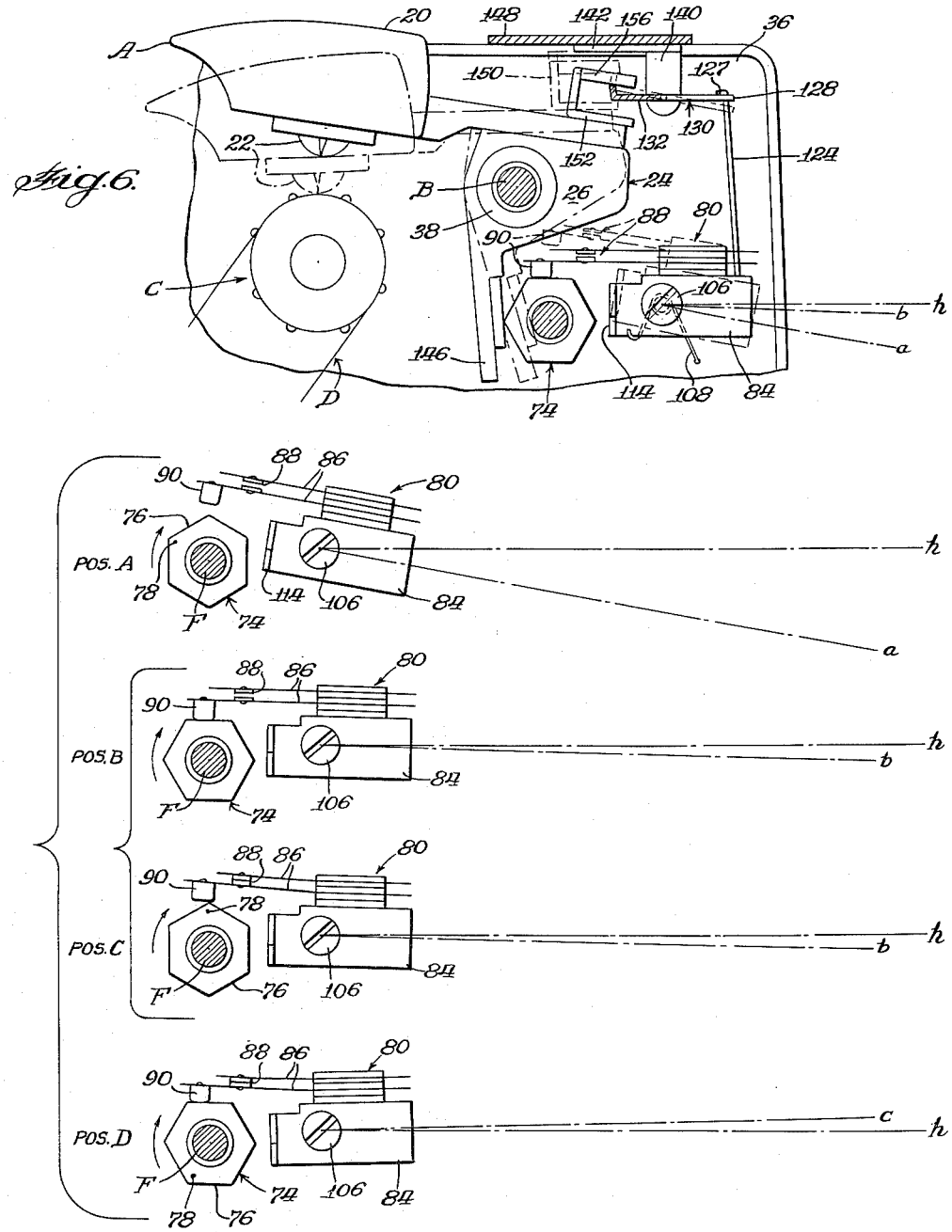

May 16, 1961 R. E. TROST 2,984,710
DICTATING MACHINE
Filed Aug. 23, 1957 5 Sheets-Sheet 4

INVENTOR.
Richard E. Trost
BY Horton, Davis,
Brewer & Brugman
Attys

May 16, 1961
R. E. TROST
2,984,710
DICTATING MACHINE
Filed Aug. 23, 1957
5 Sheets-Sheet 5
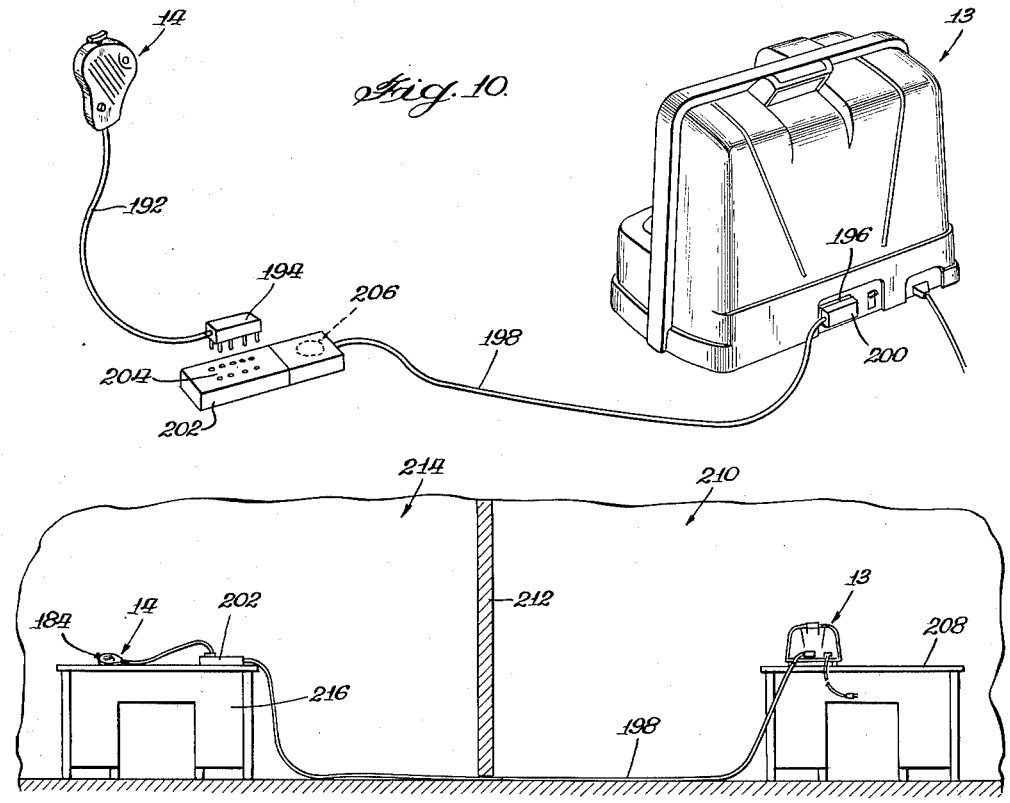
Fig. 10.
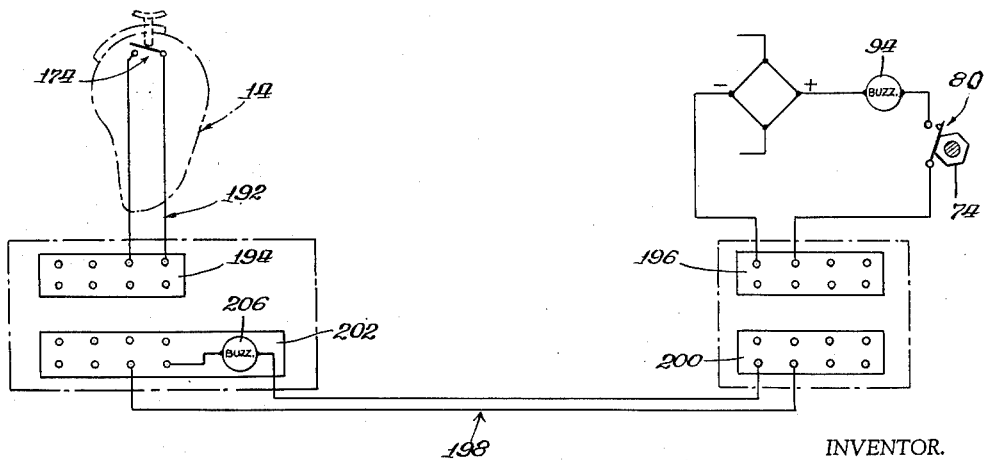
Fig. 11.
Fig. 12.
INVENTOR.
Richard E. Trost
BY Horton, Davis,
Brewer & Brugman
Attys

United States Patent Office 2,984,710
Patented May 16, 1961

2,984,710

DICTATING MACHINE

Richard E. Trost, Dundee, Ill., assignor to Comptometer Corporation, Chicago, Ill., a corporation of Illinois Filed Aug. 23, 1957, Ser. No. 679,945

22 Claims. (Cl. 179—100.2)

The present invention relates to a dictating machine.

The invention relates more particularly to signalling means in a dictating machine for indicating certain conditions of the machine as respects a dictating operation, and to controls for such signalling means.

The machine illustrated herein as embodying the features of the present invention is a recording and reproducing machine, being capable of recording signals and of reproducing them, and it is intended that it be regarded as such in the broad aspects of the invention. However, due to special features of the machine, it is specially adapted to dictation purposes, and for the sake of simplicity and convenience, it will be referred to herein as a dictating machine.

The machine thus illustrated and embodying the features of the invention includes a record medium and a transducer head movable into and out of a transducing position relative to the record medium, and also movable along a path transversely of the record medium. The specific form of machine illustrated herein is a magnetic type of machine, although the invention is not limited to that type of machine. In a magnetic machine, the record medium has a coating of magnetizable material thereon which is magnetized by a transducer in response to sound impulses, such as of the voice, impinging on an appropriate control means such as a microphone. The record medium is then utilized in a reproducing operation, as for transcribing the recorded material, in a suitable machine which may be the same machine in which the dictating operation was performed, or in another machine.

The record medium preferably is in the form of an endless belt, mounted for movement linearly in an endless path, and the transducer is mounted for movement transversely of the belt, so that the transducer traces a helical path on the record medium, in which path the signals are recorded.

The transducer, as mentioned above, is mounted for movement into and out of a transducing position relative to the record medium, this position being, in the case of a magnetic type machine, one in which a tracer member engages, or substantially engages, the record medium. The driving means for the record medium is operable for so driving it not only in the recording operation, but for other operations as well, i.e., for playing back and reversing, and it is operable, as well, when the transducer is out of transducing operation. In such circumstances, it is desirable that the user be made aware of the fact that the transducer is out of transducing position when he attempts to dictate or record, when such is the fact, by a suitable signal.

Hence, an important object of the invention is to provide signal means to indicate to the user of a dictating machine that the machine is not in condition for recording when an attempt is made to record, when such condition exists.

Another object of the invention is to provide novel means for signalling to the operator of a dictating machine, of the general character indicated above, when the transducer head approaches the end of the record medium.

A further object is to provide signal means of the character indicated that is of audible type, whereby to more effectively gain the attention of the user, relative to, for example, a visual type, since other matters would normally gain the attention of the user's sight and hence render it less likely that he would notice a visual type signal.

Another object is to provide a novel type signal means which produces a signal at a terminal portion of the transverse movement of the transducer, a first part of which is intermittent, and a latter part of which is constant, whereby to warn the user of the close approach of the end of the transducing operation and to enable him to terminate his dictation at a suitable point, and later, if he has not terminated it, to warn him to terminate it notwithstanding.

Still another object is to provide signal means of the foregoing general character that is of electrical nature and controlled by novel mechanical means.

Another object is to provide single signal means for producing a signal in either of the two circumstances outlined above, wherein novel means is provided for actuating the same signal means in either circumstance, independently of the other.

A further object is to provide a dictating machine of the character indicated, including a machine unit and a microphone unit detachably connected therewith, together with extension means for detachably interposing between the machine unit and microphone unit, whereby the machine may be utilized selectively for proximate or remote control, wherein signal means of the character indicated is provided both in the machine unit and in the extended end of the extension means for simultaneous operation.

Other objects and advantages of the invention will appear from the following detailed description taken in conjunction with the accompanying drawings, in which:

Figure 1 is a perspective view, at an angle from the front and side, of a dictating machine embodying the features of the present invention;

Fig. 2 is a perspective view of the machine of Fig. 1, but at an angle from the rear and side thereof;

Fig. 3 is a cross sectional view, on an enlarged scale, taken on line 3—3 of Fig. 1 and with a portion of the casing removed;

Fig. 6 is a view similar to Fig. 3, but on a smaller scale, and with certain portions omitted from the illustrations of Fig. 3, for purposes of simplification, showing in full and dot-dash lines, respectively, different positions of various elements of the machine;

Fig. 7 is a series of views showing a switch and a control cam therefor, with the parts in different relative positions in the different views;

Fig. 10 is a perspective view similar to Fig. 2, but with an extension means interposed between the machine unit and microphone unit;

Fig. 11 is a diagrammatic view illustrating an installation of the machine set up according to Fig. 10; and Fig. 12 is a diagram of certain portions of an electrical circuit utilized in the arrangement of Figs. 10 and 11.

Figure 4:
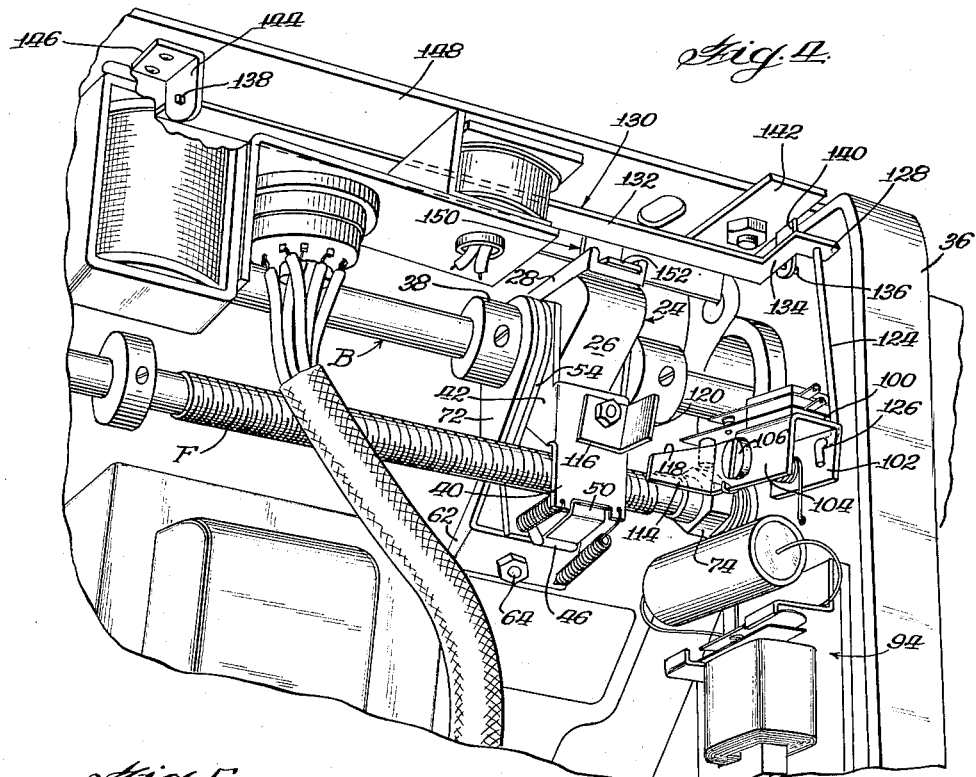
Fig. 4 is a perspective view looking upwardly from the rear of the machine, with the casing removed and showing certain internal constructional elements, this view being a fragmentary view and showing only a portion of the machine.

Referring now in detail to the drawings, attention is directed first to Figs. 1 and 2 which show the dictating machine which embodies the principles of the present invention, as a whole, these views being of the exterior of the machine as it is normally used in a dictating operation. Figs. 3 to 6, inclusive, show certain elements of structure of the interior of the machine that are necessary for a complete understanding of the present invention. As indicated above, the dictating machine illustrated is of the magnetic type and more particularly it is of the type disclosed in the copending United States Letters Patent application of Alfred E. Lorenz, Serial No. 408,907, filed February 8, 1954. Also as indicated above, the invention is not limited to such a magnetic type dictating machine, but may be embodied to advantage in various types of dictating machines.

The illustrated type of machine, generally described, usually comprises a transducer head A, a rod or other suitable support B therefor (see Figs. 3 to 6), a drivable carrier C for removably carrying and driving a record medium D (Figs. 1 and 3), and a head-traversing drive connection E, including a rotatable threaded shaft or feed screw F. In such a dictating machine, the head A is pivotally and slidably mounted on the support B for cooperation with the record medium D on the carrier C. The transducer head is thus swingable in a direction substantially normal to the record medium between a transducing position and a non-transducing position with respect to the record medium on the carrier C. When the head A is in its transducing position, it is movable by the head-traversing drive connection E along the support B to traverse the record medium D for recording or reproducing signals thereon. When the head is in its non-transducing position, it is manually reciprocable along the support B to position the head for a subsequent traversing of all or a portion of the record medium.

As is well known in the art and disclosed in the above-mentioned application, the illustrated dictating machine comprises suitable supporting, driving, control, amplifier, and casing means none of which per se constitutes any part of the present invention and none of which is therefore described in detail herein. It may be well, however, to point out briefly that in the illustrated machine, the transducer head A is of the magnetic type; the carrier C comprises rotatable drive and tension rolls; the record medium D is an endless belt adapted to have magnetic signals recorded thereon and to have such signals reproduced by the transducer head A; the rotatable drive roll of the carrier C, the rod B, and the rotatable feed screw F are mounted parallel to one another with the rod above and slightly forwardly of the feed screw and with the drive roll forwardly of and slightly below the rod; and the driving means is adapted to rotate the carrier C and the feed screw F in timed relationship, whereby during the transducing operation the transducer head traces a helical path on the record medium with the convolutions of the path spaced transversely of the record medium. The means for driving the carrier C and the feed screw F includes an electric motor contained within the casing 17 of the machine, at the remote end of each of Figs. 1 and 2, and is not illustrated in the drawings except that it is shown diagrammatically in the circuit diagram of Fig. 8.

The dictating machine includes a machine unit 13, and a microphone unit or control unit 14, so designated for convenience. As already mentioned, the carrier C includes drive and tension rolls, now designated by the reference numerals 15 and 16. The drive roll 15 is provided with a plurality of teeth or projections 18 extending radially outwardly from its peripheral surface near an end of the roll for drivingly engaging in spaced perforations 19 in the belt along one of its margins. The tension roll 16 is mounted on a pivotally mounted arm (not shown) and thus is adapted to swing between an upper position adjacent the drive roll 15 (Fig. 3), and a lower or belt tightening or tensioning position shown in Fig. 1.

The transducer head A and carriage therefor are preferably like those disclosed in the copending United States Letters Patent application of Alfred E. Lorenz, Serial No. 489,201, filed February 18, 1955. Such a transducer head comprises a suitable casing 20 and a transducer therein having a tracer member 22 depending therefrom outside of the casing and being relatively thin in a direction transversely of the belt on the carrier C. The transducer head A is adapted to be mounted on a carriage 24 in such a manner that the tracer member 22, when the head is in its transducing position, is closely adjacent the drive roll 15 (Fig. 5) for lightly engaging the record medium thereon. In the illustrated dictating machine, the engagement between the tracer member and record medium for optimum transducing relationship therebetween occurs in a vertical plane including the axis of the drive roll 15.

In the illustrated embodiment of the invention the carriage 24 includes a main body portion 26 mounted for movement in the manner described below and serving as the means directly to which the head A is secured. The head A has a rearwardly extending arm 28 shown for convenience as being U-shaped in cross section (Fig. 4) and fitted to the upper flat surface 30 of the body portion 26 and secured thereto by means such as screws 32 extending through slots 34 in the arm and threaded into tapped holes in the body portion 26. The slots 34 are longitudinally aligned and longitudinally elongated relative to the arm 28 for enabling substantial horizontal adjustment of the transducer head A in a direction transversely of the axis of the drive roll 15. The head A is thus adjustably mounted on the carriage 24 with the tracer member 22 above the drive roll 15. This adjustment is accomplished by loosening the screws 32 and moving the transducer head forwardly or rearwardly the extent desired to position the tracer member 22 at the optimum position relative to the drive roll 15, and thereafter tightening the screws 32 to secure the head in such adjusted position. It will be noted that such adjustment of the head A is in a direction longitudinally of the arm 28 which in turn is on a line transversely of the axis of the drive roll 15. Upon movement of the transducer head A in either direction from its position of optimum transducing relationship with the record medium, it is moved, angularly speaking, a large amount from the vertical, radial plane of the drive roll 15.

Figure 5:
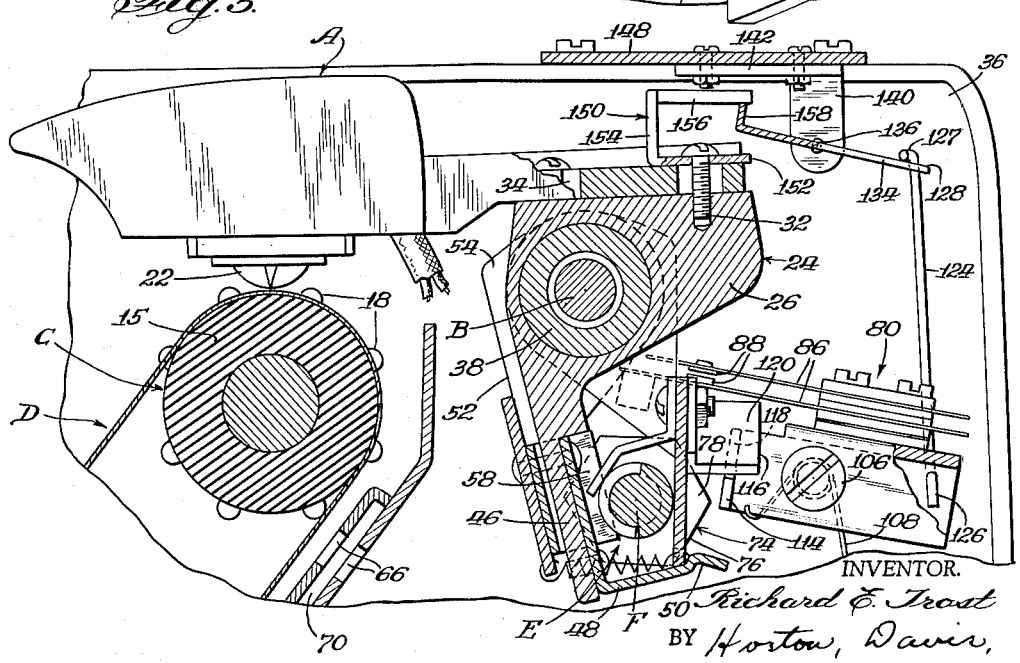
Fig. 5 is a view similar to Fig. 3, but with various parts in a different position.

The carriage 24, shown in detail in the Lorenz application, Serial No. 489,201, referred to above, is mounted for movement transversely of the belt and consequent movement of the transducer head A in that direction. The guide rod B which extends transversely of the machine is suitably mounted in frame elements of the machine, one of which, 36, is shown in Figs. 3, 4 and 5. This element 36 is a vertical wall member on which various of the elements of the machine are mounted, including some of those shown herein and various elements of the drive mechanism for driving the operating parts, but not shown herein. The specific means for mounting the carriage on the guide rod includes a hub 38 receiving the guide rod and slidable thereon. Associated with the carriage 24 is the drive connection E, referred to above, for feeding the carriage and thereby the transducer head A along the guide rod B. The carriage includes a depending arm 40 having transverse tabs 42 receiving the hub and enabling relative pivotal movement thereon. The lower end of the arm 40 has a plate 44 secured thereto which with the lower extremity of the arm cooperates with the feed screw F. This feed screw is journalled in suitable bearings in the frame of the machine, one of which is the frame element 36 referred to above. The plate 44 and the lower extremity of the arm 40 are on effectively opposite sides of the feed screw F whereby the arm 40 is normally maintained or restrained by the feed screw against pivotal movement relative to the axis of the guide rod. The surfaces on the plate 44 and arm 40 that engage the feed screw do not effect threading thereof for movement of the carriage, the surfaces being broad and engaging the outer extremities of the threads on the screw. The feed screw F is driven by suitable means (not shown) but which preferably is the same motor that drives the drive roll 15. Attention is directed to the Lorenz application, Serial No. 489,201, referred to above, for the details of the drive to the feed screw F as well as to the drive roll 15.

The carriage 24 includes also a depending arm 46 which may be an integral extension of the body portion 26. The lower end of this arm has mounted thereon a leaf spring 48 with an end portion forming a detent or latch 50 engageable with the lower end of the arm 40. This detent releasably engages either side of the arm 40 for retaining the head A in a corresponding position. The transducer head A is movable from the transducing position shown in Fig. 5 to a non-transducing position raised therefrom, as by rotating the transducer head clockwise about the guide rod B to the position shown in Fig. 3. In the lower or transducing position of the transducer head, the detent 50 engages the rear side of the arm 40 (Fig. 5) and in the non-transducing position it engages the front side (Fig. 3), in both cases releasably engaging the arm for normally retaining the transducing head A in the set position but enabling it to be moved to the opposite position when the necessary external force is applied thereto.

A third arm 52 is included in the carriage assembly and is mounted on the hub 38 by means of lateral tabs 54 having aligned apertures receiving the hub. This arm is on the same side of the feed screw F as is the arm 46 and on the outside or front side of the latter. A tension spring 56 interconnects the lower ends of the arms 40 and 52. Secured on the arm 52 is a screw follower 58 having an edge 60 engageable with the threads on the feed screw F for feeding the carriage, and thus transducer head A, along the guide rod B. When the head is in its transducing position, the edge 60 engages the threads of the screw, and when the head is raised to non-transducing position, the edge is out of engagement with the threads, enabling the free sliding movement of the carriage and head along the guide rod as when so manually manipulated.

The dictating machine embodying the features of the present invention preferably also includes a logging means of the kind disclosed and claimed in the copending United States Letters Patent application of Charles J. Charvat, Serial No. 604,687, filed August 17, 1956. In Fig. 4 herein an arm 62 of such logging means is shown, and a lower end portion thereof is shown in dot-dash lines in Fig. 3. Since the logging means does not per se enter into the present invention, it is not shown or described in detail herein, but full details thereof may be obtained from the Charvat application mentioned. Briefly, the logging arm 62 includes a piercing element 64 and upon actuation of the logging arm 62 in the appropriate direction (clockwise, Fig. 3) the piercing element enters into and through apertures 66 in elements 68 of a portion of the casing of the machine which define a slot 70 for receiving a logging record (not shown). Upon the piercing element 64 so entering the apertures, the logging record in the slot 70 is pierced to indicate a corresponding position in the range of movement of the transducer head. The logging arm 62, as seen in Fig. 4, may be of a construction similar to the other arms described, namely, 40 and 52, in the means for mounting them, the logging arm thus having tabs 72 provided with apertures receiving the hub 38.

Mounted on the feed screw F is a rotary cam 74 which conveniently may be in the form of a nut-like element and in the present instance is a hexagonal member. The rotary cam 74 thus has flat sides 76 constituting relative depressions in the outer peripheral camming surface of the cam and lobes 78 formed at the juncture of adjacent flat sides. The rotary cam 74 is for the purposee of controlling and actuating a switch indicated in its entirety at 80 and described fully hereinbelow. The rotary cam 74 is secured to the feed screw F for rotation therewith and is operative for controlling the switch 80 when the feed screw F is rotating in certain conditions specified hereinbelow.

Figure 8:
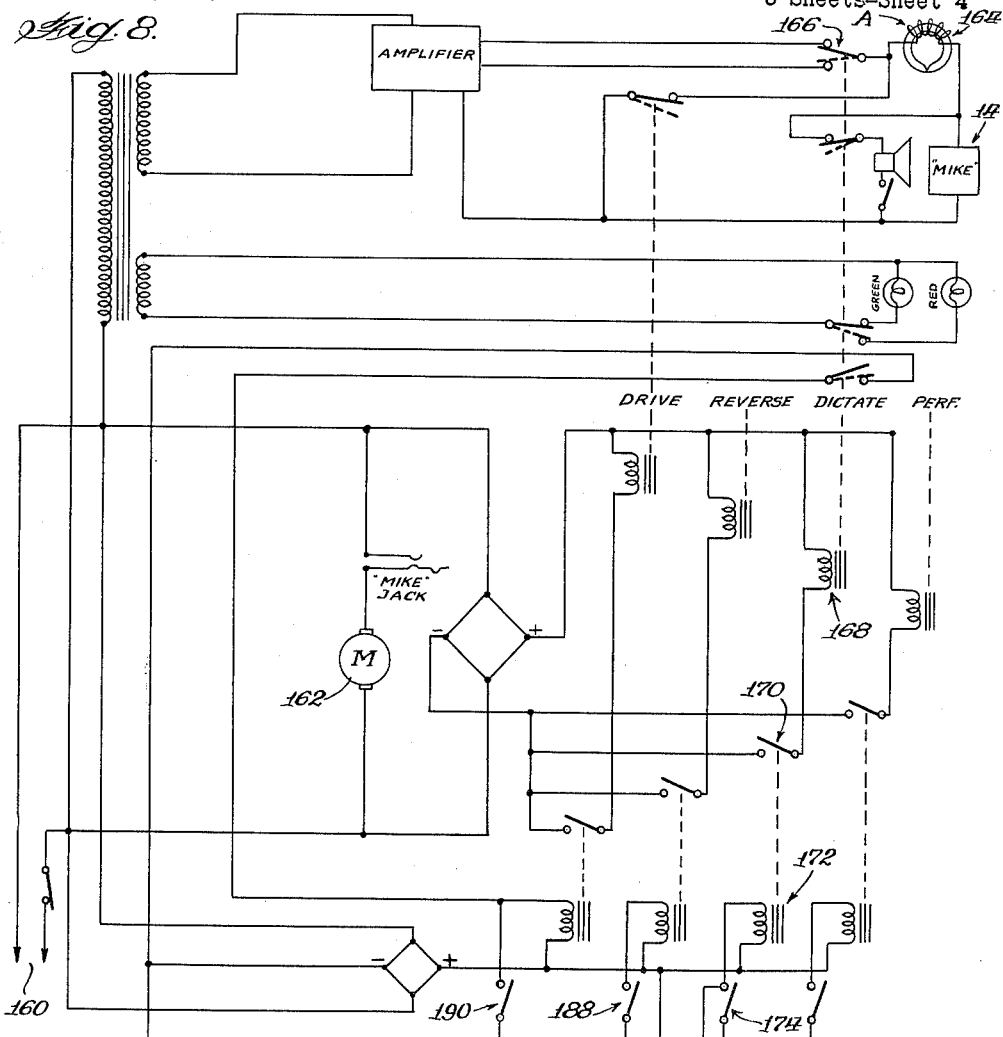
Fig. 8 is a diagram of the electrical circuit utilized in the machine.

The switch 80 is mounted on a bracket 84 which in turn is mounted on a suitable element of the machine for pivotal movement thereon. The switch 80 is a conventional switch and is provided with resilient switch blades 86 having cooperating contacts 88 thereon for interengagement. The extended ends of the switch blades 86 project over the rotary cam 74 (see particularly Fig. 7) and the lower one, i.e., the one adjacent the rotary cam 74, is provided with an actuating element 90 that engages the rotary cam in certain positions of the switch. The switch blades 86 are normally self-biased or pre-stressed to open position of the contact elements and are moved to closed position by the rotary cam engaging the actuating element. The switch blades 86 are provided with electrical connections 92 connected in circuit with a signal means 94 which, in the present instance, is a conventional electric buzzer referred to again hereinbelow. The circuit including the switch and buzzer and other control elements is shown in Figs. 8 and 12 and will be described in full hereinbelow. The switch 80 includes a block of insulation material 96 made up of a plurality of pieces or laminations separating the switch blades 86 and together as a block being mounted on the bracket 84 by suitable means such as screws 98.

The bracket 84 supporting the switch 80 may be of suitable construction and preferably is a U-shaped bracket as shown in Fig. 4, having a top web element 100 and side flanges 102 and 104, the web 100 serving as the means directly to which the block 96 is secured. The bracket 84 is mounted for pivotal movement on an axis element 106 which may be a pin or stud extending through apertures in the side flanges 102 and 104 and secured in the frame element 36. The pin or stud 106 is provided with a suitable head for retaining the bracket thereon. The bracket 84 and thus the switch 80 mounted thereon together in assembly are arranged for swinging movement about the axis of the pin 106 for moving the switch into and out of operative position with relation to the rotary cam 74. The assembly thus described is biased to an inoperative position, i.e., a position relatively remote from the rotary cam 74 in which the switch normally remains in its self-biased open position, by means of a spring 108 which preferably is a coil spring having a coil surrounding the pin 106 and one arm 110 hooked under the flange 104 of the bracket and the other arm 112 anchored on a fixed element of the machine such as the frame element 36. The spring is arranged for biasing the bracket and switch in the direction named, which is in clockwise direction as viewed in Figs. 3 and 5 and as viewed from the left in Fig. 4.

One of the flanges of the bracket 84, and preferably the flange 104, has a transversely extending cam element 114 arranged for engagement by a trip element 116 secured to the carriage 24 and actuated by the trip element at the end of the range of movement of the carriage, as explained more fully hereinbelow. The cam element 114 extends parallel with the feed screw F, i.e., longitudinally of the path of movement of the carriage 24. This cam element 114 has an inclined camming surface 118. The trip element 116 is preferably in the form of an angle piece and has a rearwardly extending flange 120 so positioned for engaging the inclined camming surface 118 and when it does engage that surface and moves along with the carriage, it depresses the cam element 114 and thereby swings the bracket 84 in counterclockwise direction (Figs. 3 and 5) and hence swings the switch 80 in the same direction. This brings the extended ends of the switch blades 86 (left end, Figs. 3 and 5) downwardly into proximity to the rotary cam 74 for engagement by the latter, in a manner described in detail hereinbelow. The specific means by which the trip element 116 is mounted on the carriage may be as desired, but for convenience a flange of the trip element is fitted directly to the arm 40 and secured thereto by a bolt 122 which may be the same means for securing the plate 44 to the arm 40.

The switch assembly, including the bracket 84 and switch 80, is connected by means of a linkage with the carriage 24 and hence the transducer head, for movement of the switch in response to movement of the transducer head into and out of transducing position. The linkage includes a link 124 having a lower end portion 126 bent or shaped for extension through an aperture in the flange 102 and normal retention therein. The opposite and upper end of the link element 124 extends through an aperture in an end element 128 of an actuating bar 130, and is bent over at 127 for normal retention in the aperture. Upon swinging movement of the bar 130 as described below, the link 124 is actuated which in turn swings the switch 80. The actuating bar 130 extends across and beyond the full range of movement of the transducer head in its transverse path. This bar includes a main longitudinal portion 132 (Fig. 4) with a short lateral extension 134 which terminates in the end element 128 mentioned above. The element 128 extends longitudinally of the bar and receives the link element 124. The bar 130 is provided with pivot elements which may be in the form of pins integral with or secured to the bar, these pin elements being designated at 136 and 138. These pin elements define an axis of rocking movement of the bar which extends longitudinally of the bar but laterally offset from the main longitudinally extending element 132. The pin 136 is rockably mounted in a tab 140 extending downwardly from a mounting bracket 142, while the pin 138 at the opposite end is rockably received in a downwardly extending tab 144 on a bracket 146. The brackets 142 and 146 are suitably secured to a fixed element of the machine and preferably by means of a longitudinally extending top plate 148 which may be secured to the frame element 36 and a similar or corresponding element at the opposite end of the machine (not shown). It will be understood that any fixed elements of the frame of the machine may be utilized for so mounting this actuating arm 130.

An actuating element indicated in its entirety at 150 is shown in Figs. 3, 4 and 5, but more particularly in Figs. 3 and 5. This actuating element is for the purpose of directly engaging the actuating bar 130 and rocking the latter in response to movements of the transducer head to non-transducing position. This actuating element 150 preferably is generally U-shaped, having a lower leg 152 secured to the transducer head or an extension thereof which may be the arm 28. This leg 152 may be secured by suitable means such as one of the screws 32 which secure the arm 28 to to body portion 26. Extending upwardly from the leg 152 is an arm or web 154 and from the upper end of the latter a top leg 156 is secured, extending over the adjacent edge portion of the actuating bar 130. Preferably the adjacent edge of the bar is provided with an upturned flange or edge 158. When the transducer head A is moved to non-transducing position, namely, to that position shown in Fig. 3, it is rocked in clockwise direction about the axis of the support or rod B. This swings the rear end of the arm 28 and thus the element 150 downwardly and the leg 156 engages the flange 158 on the actuating bar and swings the latter about its axis in direction for moving the switch 80 into operative position, namely, swings the actuating bar 130 in counterclockwise direction as viewed in Figs. 3 and 5. This swinging movement of the actuating bar lifts or draws upwardly on the link element 124 which in turn swings the bracket 84 and switch 80 in counterclockwise direction. The left or extended ends of the switch blades 86 thus are moved downwardly into position for engagement by the rotary cam 74. Upon movement of the transducer head A to transducing position, namely, that of Fig. 5, it is swung in opposite or counterclockwise direction. When this is done the leg 156 of the element 150 is lifted, and the force previously exerted downwardly on the flange 158 is removed. This permits the bracket 84 and switch 80 to be swung to inoperative position, namely, in clockwise direction, by the spring 108. Thus the switch 80 is disposed in operative position, i.e., the position for actuation by the rotary cam 74, when the transducer head is in non-transducing position. The specific details of the operation of the switch and the signal means controlled thereby will be described hereinebelow, but it may be stated at this point that the signal means is actuated, in one phase of the invention when an attempt is made to dictate or record when the transducer head A is out of transducing position. The switch means 80 is connected in circuit with another switch means as described below so that the signal means is operated only when all of the conditions are present which are relied on to control the giving of the signal which includes not only closing of the switch 80, but closing of another switch in the microphone unit 14, which normally is closed only when it is desired to dictate.

Figure 9:
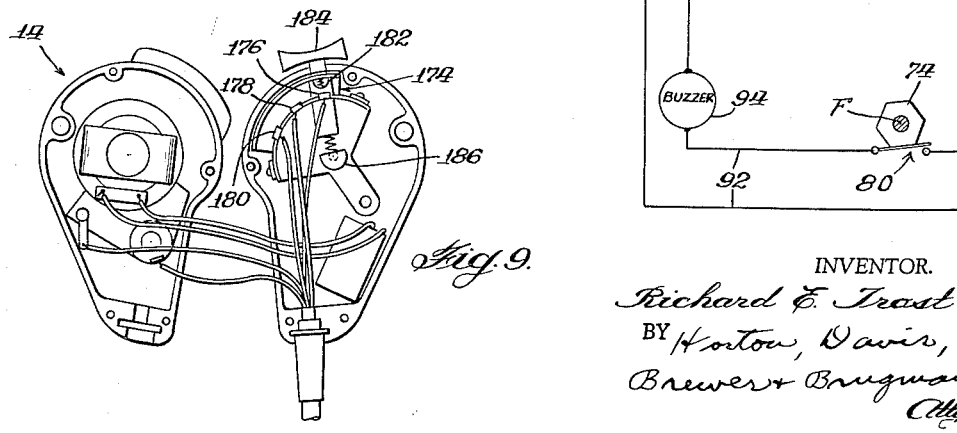
Fig. 9 is a view of the microphone unit with parts thereof separated and showing the interior thereof.

Attention is next directed to Fig. 8 showing the diagram of the circuit utilized in the present machine. This circuit includes the circuit shown in Fig. 12 of my copending United States Letters Patent application, Serial No. 635,295, filed January 22, 1957, together with the electric signal means or buzzer 94 and the switch 80. The circuit of Fig. 8 herein includes a source of current indicated at 160 which is connected in circuit with a driving motor 162. This driving motor, through the drive means referred to above (not shown), drives the drive roll 15, and the feed screw F for moving the transducer head transversely along the record medium D. The transducer in the transducer head A is indicated diagrammatically at 164 (upper right corner, Fig. 8) and is controlled by a switch 166 which in turn is controlled by a relay coil 168, this coil being also designated "dictate." The relay coil 168 in turn is controlled by a switch 170 forming a relay with a coil 172, the latter being under the control of a hand or manually operated switch 174. The switch 174 is contained in the microphone unit 14, which is included in Figs. 1 and 2 and which is shown in open position in Fig. 9. This microphone unit, as explained in my copending application, Serial No. 635,295, referred to above, includes a plurality of switch means for variously controlling the operation of the machine unit 13. Briefly, the microphone unit 14 includes a plurality, and in this case three, switch contacts 176, 178 and 180 engageable selectively by another switch contact 182 which is mounted on a control element 184 which is in the nature of a push button and a pivoted lever. This control element serves as a single control element for a plurality of control operations or functions whereby to control from the microphone unit and through the single manipulable element, the dictating, reversing, and reproducing operations, at a point remote from the machine unit. The control element 184 is swingable about an axis defined by a mounting member 186 into position, selectively, in alignment with the various switch contact elements 176, 178, 180, and upon depression of the member 184, which is provided for, the switch contact element 182 makes contact with the respective ones of the elements 176, 178, 180. In the position of the member 184 as shown, and upon depression of the member, contact is made with the element 176 and the switch means thus produced is the switch 174 of Fig. 8 for the recording or dictating operation. The other contacts 178, 180 form switches as indicated at 188 and 190 respectively in Fig. 8. The switch 80 described above (Figs. 3, 4 and 5) and the signal means or buzzer 94 are connected in series with the switch 174 as will be noted from Fig. 8, and hence upon closing both switches 174 and 80 the signal means or buzzer 94 will be actuated in the normal operation of the machine.

As mentioned above, the single signal means is utilized for producing a signal when an attempt is made to dictate or record when the transducer head is out of transducing position, as well as to produce a signal when the transducer head approaches the end of its movement transversely of the belt record medium. Considering in detail first, the first of these two signalling operations, attention is directed first to Figs. 3, 5 and 6. Fig. 6 is a simplified or relatively diagrammatic composite illustration of the positions of the elements indicated in Figs. 3 and 5. Fig. 6 shows the transducer head in each of its two positions, and the switch means 80 is accordingly shown in each of its two positions. The transducer head is shown in full lines in non-transducing position and accordingly the switch means 80 is shown in full lines in its operative position or that position in which it can be operated or actuated by the rotary cam 74. The two positions of the switch means 80 indicated in Fig. 6 are also shown in Fig. 7, which indicates four different positions of the different elements shown. In position A the switch is out of operative position; positions B and C show the switch means in operative position, in the same position in both positions, but the rotary cam 74 is shown in each of two different positions; the position of the switch 80 in both positions B and C is that position represented in full lines in Fig. 6 in which the switch is in an operative position. When the transducer head A is in its transducing position shown in Fig. 5 and shown in dot-dash lines in Fig. 6, the switch 80 is moved to its inoperative position or that position shown in dot-dash lines in Fig. 6. This position is also indicated in position A of Fig. 7 in which the element 90 of the switch is out of the path of movement of the lobes of the rotary cam 74. In position A this element 90 is spaced from the adjacent lobe and hence it will be seen that in such position of the switch 80 no effect is produced by the rotary cam 74 and the switch remains open.

However, when the transducer head A is moved to its non-transducing position or that shown in Fig. 3, and in full lines in Fig. 6, the switch 80 is moved to its operative position indicated in Fig. 3 and in full lines in Fig. 6. This position of the switch is also indicated in positions B and C of Fig. 7. This position of the switch results in intermittent closing of the switch in response to rotation of the rotary cam 74. By reference to position B in Fig. 7, it will be noted that the element 90 of the switch engages one flat side 76 of the cam and the contacts 88 are open or separated. However, upon rotation of the cam 74 to the position shown in position C, a lobe 78 engages the element 90 and raises the lower switch blade 86 to close the contacts 88. Upon further rotation of the rotary cam 74 when the element 90 rides onto a flat side 76 of the rotary cam, the contacts 88 again open. This intermittent closing and opening of the contacts 88 results in producing an intermittent signal in the signal means or buzzer 94 when it is attempted to dictate with the transducer head in non-transducing position. In the event that such an attempt is made, the switch 174 (Figs. 8 and 9) is closed and the circuit is closed through the buzzer 94. However, when the transducer head A is in its transducing position and the operator proceeds to dictate, the switch 80 remains open as indicated at position A of Fig. 7 and the signal means or buzzer 94 is not actuated.

It is preferred that an audible type of signal such as the buzzer 94 be provided so as to more effectively attract the attention of the operator because the operator in a dictating operation normally has his sight occupied in the subject matter of the dictation operation. However, it will be understood that other kinds of signal may be provided if desired, such as visual means, e.g., an electric light, or other means.

The illustration of Fig. 7 indicates four positions of the switch means 80 and/or the rotary cam 74 in the various operations. In the signalling function in connection with attempting to record or dictate when the transducer head is not in transducing position only positions A, B and C were considered. On the other hand, the fourth position or that indicated at position D comes into play in that phase of the invention having to do with producing a signal as the transducer head approaches the end of its movement relative to the record medium. The arrangement of the signal means in this phase of the invention is such that as the transducer head approaches the end of its movement, first an intermittent signal is produced, and thereafter the signal becomes steady or contsant. The switch 80 is, as will be seen from the above description of its construction, actuatable by either movement of the transducer head A, i.e., in swinging movement about the axis of the rod B, or movement of the transducer head along the rod B, in the latter case through the medium of the trip element 116 and the cam member 114. The switch 80 assumes a normal position indicated at position A of Fig. 7, in a dictating operation and until the transducer head approaches the end of its movement. As the transducer head does approach the end of its movement, such as that indicated in Fig. 4, and then continues its movement, the trip element 116 engages the cam member 114 and rides along the camming surface 118 thereof. The trip element 116 being relatively fixed, vertically, the cam member 114 is swung downwardly which effects swinging movement of the bracket 84 and hence the switch 80. The movement of the switch in this swinging movement is gradual or progressive and when it reaches the position indicated at B and C in Fig. 7, the element 90 is in position for engagement by the rotary cam 74. An intermittent signal is thus produced as described in connection with the signalling function hereinabove, the switch 174 (Figs. 8 and 9) being, of course, closed in the dictating operation.

Upon continued movement of the transducer head along its path, i.e., along the rod B, the cam member 114 continues to be lowered under the effect of the trip element 116, and the switch 80 is swung further downwardly and into position D of Fig. 7. In the latter position the contacts 88 are shown closed or in engagement when the element 90 is in engagement with the flat surface 76 of the rotary cam, and hence they remain in engagement or closed as the element 90 rides up on the lobes 78 of the cam. It will be understood that the spring arms 86 of the switch are resilient and readily flex under the action of the cam 74. The contacts 88 remain closed and the signal produced by the signal means or buzzer 94 is steady or constant.

The relative positions of the elements, as will be understood, are such that this signal is produced at the desired location on the record medium, namely, adjacent the terminal edge thereof.

The various positions of the switch 80 in Fig. 7 are indicated by center lines designated $a$, $b$, and $c$, which may be compared with the fixed horizontal reference line $h$. In the case of the positioning of the switch 80 as determined by transducing or non-transducing position of the transducer head A, the switch assumes two distinct positions, namely, that indicated at position A and that of position B or C. In the case of the switch as positioned by the trip element 116 engaging the cam member 114, the switch 80 moves progressively and assumes the extreme positions A and D, as well as various positions intermediate those two extreme positions.

Since the switch 80 is moved a greater extent under the action of the trip member 116 and cam member 114, than it is under the action of movement of the transducer head A between transducing and non-transducing positions, and normally moved even when the transducer head remains in transducing position, provision is made for play between the bracket 84 with the switch thereon, and the actuating bar 130. This may be provided by enabling the link 124 to slide through the aperture in the end element 128 on the actuating bar, when the bracket 84 and switch are moved to position D.

Attention is next directed to Figs. 10, 11, and 12 illustrating a remote control arrangement for the dictating machine, with signal means at the remote point of control as well as in the machine unit. The construction described in the foregoing is arranged primarily for proximate control, the microphone unit 14 being normally used in the immediate vicinity of the machine unit (Figs. 1 and 2). The microphone unit 14 includes a cable 192 having a male connector plug 194 detachably connected in a female connector socket 196 in the machine unit. This connector, including the plug and socket, is of conventional construction, and detachable for detaching the microphone unit 14 from the machine unit 13. In the remote control arrangement of Figs. 10 to 12, an extension member 198 is interposed between the socket member 196 in the machine unit and the connector plug 194 on the microphone unit 14. The extension member or cable 198 includes a connector plug 200 similar to the connector plug 194 and hence connectible with the socket 196. On the other and extended end of the cable 198 is a junction box 202 having a socket portion 204 for receiving the plug 194 on the cable 192. The junction box 202 is also provided with a signal means 206 which is preferably a buzzer similar to the buzzer 94 and arranged for sounding simultaneously with the latter. This buzzer is also a conventional buzzer and is incorporated in the junction box 202 in any suitable manner. The circuit of Fig. 12 indicates the connections made through the extension 198. The microphone unit 14 is provided with the switch 174 as referred to above. The connector plug 194 is connectible either with the socket 196 or with the junction box 202. The circuit portion at the right-hand end of Fig. 12 indicates that portion of the circuit of Fig. 8 at the lower right-hand corner of the latter. With the connector plug 194 inserted in the socket 196 the switch 174 and the switch 80 are arranged in series. Similarly, with the extension cable 198 interposed and the connector plug 194 connected to the junction box 202 and the connector plug 200 connected with the socket 196, the switch 174 is again arranged in series with the switch 80 and the two together in series with the signal means or buzzer 94. The signal means 206, as will be seen from Fig. 12 in the arrangement shown, is connected in series with the signal means 94 so that upon closure of the switches 174 and 80 the signal means 206 is actuated simultaneously with the signal means 94.

The remote control arrangement may be set up in a manner indicated in Fig. 11 where the machine unit 13 is shown on a stenographer's desk 208 in a room 210. The extension cable 198 is extended through the wall 212 into the room 214 where the dictator is located. The junction box 202 rests on a desk 216 used by the dictator. Upon the dictator at the desk 216 performing a dictating operation, and consequent closing of the switch 174 in the microphone unit, through depression of the button 184, the recording or dictating function is performed in the machine unit 13 on the desk 208 in the manner exactly as described above. When in the course of the dictating operation when set up in this manner, a signal is produced in the machine unit 13, a similar signal is produced in the signal means in the junction box 202 at the location of the dictator.

The stenographer may thus use the same machine as the dictator without the necessity for carrying the machine unit 13 from one location to another as from one room to another, and alternatively, the same machine may be conveniently located in the same room where the dictator is located.

Another advantage of the arrangement just described for remote control is that a single machine unit 13 may be utilized for a plurality of dictators. In such an arrangement an extension cable 198 may extend from the machine unit 13 to each of a number of rooms such as the room 214 where a dictator is located, and a stenographer at the location of the machine unit may connect the corresponding extension cable. The utilization of a signal means in the machine unit 13 when a remote control set-up is utilized indicates to the stenographer at the desk 208 that the machine unit should have attention, for example, that the transducer A is not in transducing position, or that it is approaching the end of the record medium. In any event, the stenographer is warned to take whatever measure is necessary and at the same time the dictator in the remote room 214 is apprised of a condition such as one of those mentioned. Accordingly, the stenographer may make whatever adjustment is necessary for the dictator in the remote room, such as to place a new record medium in the machine unit.

The signal means or buzzer 94 is under the control of the switch 174 in the microphone unit as well as the switch 80 which is actuated in only certain conditions such as an abnormal condition or the approach of the end of the recording operation. As long as the switch 174 is open the signal means is inoperative and the switch 174, as was noted, is the control switch for the recording or dictating operation. The microphone unit 14 contains also the other switches mentioned, namely, 188 and 190, for performing certain functions in the machine such as reversing the record medium and driving the record medium forwardly while the listening or playing back operation is being performed. In neither one of the latter two conditions is the signal means energized or set up for operation. Thus the utilization of the signal means is directed to the most effective and most beneficial use. For example, if the user of the machine should perform an operation that was to be a dictating operation but with the transducer head out of transducing position, were it not for the signal means valuable time may have been spent without corresponding recordation of the material to be dictated. Similarly, at the end of the dictating operation, the operator is apprised of the approach of the end of the range of recording capacity and can take advantageous steps so as, for example, to cease dictating at a convenient break in the material to be dictated to avoid the loss of continuity. On the other hand, the need or desirability for a signal in other functions of the machine such as reversing the record medium upon closure of the switch 188 or upon driving the record medium forwardly in a listening or playing back operation when closing the switch 190, is not so great and hence effective signalling for the over-all dictating operation is provided by a simple signalling and control means therefor. The single signal means serves for producing the desired signal in different functions of the machine or for different purposes, by independent control means, each without in any way hindering the effect of the other.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A dictating machine comprising, means for mounting a record medium for movement in a predetermined path, a transducer head mounted for movement into and out of transducing position relative to said path, said transducer head being movable in a path transversely of the path of said record medium, means selectively connectible with said mounting means for driving the latter, means for forming a driving connection between the driving means and transducer head for moving the latter in its said path, means for controlling the driving means, signal means, and means energizing said signal means when the driving means is connected for driving the mounting means and the transducer head is out of said transducing position.

2. A dictating machine comprising a machine unit including means for mounting a record medium for movement in a predetermined path, a transducer head mounted for movement into and out of transducing position relative to said path, said transducer head being movable in a path transversely of the path of said record medium, means selectively connectible with said mounting means for driving the latter, means for forming a driving connection between the driving means and transducer head for moving the latter in its said path, the machine also comprising a microphone unit, means connecting the units together for limited movement of the microphone unit relative to the machine unit, manually actuable means in the microphone unit for controlling the driving means, and signal means operative when the driving means is connected for driving the mounting means and the transducer head is out of said transducing position.

3. A dictating machine comprising a machine unit including means for mounting a record medium, a transducer head mounted for movement into and out of transducing position relative to a record medium on the mounting means, said transducer head being movable in a path transversely of a record medium so mounted, means for driving the mounting means, means for forming a driving connection between the driving means and transducer head for moving the latter in its said path, the machine also comprising a microphone unit, means detachably connecting the microphone unit to the machine unit for limited movement of the microphone unit relative to the machine unit, manually actuable means in the microphone unit for controlling the energization of the driving means, and signal means operative when the driving means is energized for driving the mounting means and the transducer head is out of said transducing position, extension means, means forming a detachable connection between the extension means at a first end and the machine unit, and at a remote end with the microphone unit, and signal means in said remote end of the extension means, said last signal means being connected with the signal means in the machine unit for operation simultaneously with the latter signal means.

4. A machine of the character disclosed comprising means for mounting a record medium, means for driving said mounting means for carrying a record medium thereon in a linear direction, a transducer head mounted for movement transversely of a record medium on said mounting means, and for movement into and out of a transducing position relative to such record medium, means for driving said transducer head in its said transverse direction when it is in transducing position, means for energizing said transducer head for recording on a record medium on said mounting means, signal means, switch means for controlling said signal means, and means operative in response to the transducer head being out of its transducing position and the transducer head being energized, for actuating said switch means.

5. A machine of the character disclosed comprising means for mounting a record medium, means for driving said mounting means for carrying a record medium thereon in a linear direction, a transducer head mounted for movement transversely of a record medium on said mounting means, and for movement into and out of a transducing position relative to such record medium, means for driving said transducer head in its said transverse direction when it is in transducing position, means for energizing said transducer head for recording on a record medium on said mounting means, signal means, switch means for controlling said signal means, means biasing said switch means to an inoperative position, and means for moving said switch means to an operative position in response to said transducer moving out of its transducing position.

6. A machine of the character disclosed comprising means for mounting a record medium, means for driving said mounting means for carrying a record medium thereon in a linear direction, a transducer head mounted for movement transversely of a record medium on said mounting means, and for movement into and out of a transducing position relative to such record medium, means for driving said transducer head in its transverse direction when it is in transducing position, means for energizing said transducer head for recording on a record medium on said mounting means, signal means, switch means for controlling said signal means, means biasing said switch means to an inoperative position, and actuating means for moving said switch means to an operative position in response to movement of said transducer head out of transducing position, said actuating means and transducer head having operative engagement enabling movement of the transducer head throughout its transverse movement while operatively engaging the actuating means.

7. A machine of the character disclosed comprising means for mounting a record medium, means for driving said mounting means for carrying a record medium thereon in a linear direction, a transducer head mounted for movement transversely of a record medium on said mounting means, and for movement into and out of a transducing position relative to such record medium, means for driving said transducer head in its transverse direction when it is in transducing position, means for energizing said transducer head for recording on a record medium on said mounting means, signal means, switch means for controlling said signal means, means biasing said switch means to an inoperative position, means moving said switch means to an operative position in response to movement of the transducer head out of transducing position, and means driven by said driving means operative when said switch means is in its said operative position for intermittently closing and opening the switch means.

8. A dictating machine comprising means for mounting a record medium, a transducer head movable into and out of a transducing position and when in said transducing position movable along a predetermined path, motor means for driving said mounting means and moving the transducer along its said path, means for energizing said transducer head including a first switch, electric signal means, a second switch, an electric circuit connecting said switches and signal means in series, means operative in response to movement of the transducer head to transducing position for moving said second switch to open position, means operative when the transducer head is out of transducing position for moving said second switch to a second position, and means driven by said motor means for intermittently closing said second switch when the latter is in its said second position.

9. A dictating machine comprising means for mounting a belt record medium for movement in a predetermined path, a transducer head movable along a predetermined path transverse to and extending substantially the width of a record medium on said mounting means, motor means for driving the mounting means for the record medium and moving the transducer head along its said path, manually actuated means for controlling said motor means, signal means, and means for intermittently actuating said signal means controlled by said transducer head when it is in transducing position and approaches, but is spaced from, the end of its movement in its said path.

10. A dictating machine comprising means for mounting a belt record medium for movement in a predetermined path, a transducer head movable along a predetermined path transverse to and extending substantially the width of a record medium on said mounting means, motor means for driving the mounting means for the record medium and moving the transducer head along its said path, manually actuated means for controlling said motor means, signal means, and means controlled by said transducer head when it is in transducing position and approaches the end of its movement in its said path for actuating said signal means first intermittently and thereafter steadily.

11. A dictating machine comprising means for mounting a record medium for movement in a predetermined path, a transducer head movable along a predetermined path transverse to a record medium on said mounting means, motor means for driving the mounting means for the record medium and moving the transducer head along its said path, manually actuated means for controlling said motor means, signal means, means for controlling said signal means, means driven by said motor means for actuating said signal controlling means, means biasing said signal controlling means toward an inoperative position relative to said actuating means, and means operative in response to movement of said transducer head toward the end of its said path for moving said signal controlling means progressively into an operative position relative to said actuating means, said actuating means being positioned relative to said signal controlling means for actuating the latter first intermittently and thereafter constantly in response to movement of said signal controlling means into its said operative position.

12. A dictating machine comprising means for mounting a record medium, a transducer head movable relative to a record medium on said mounting means, means for driving said mounting means and transducer head, signal means, a rotary cam driven by said driving means, a switch for controlling said signal means, said switch having a normal inoperative position and being movable to an operative position relative to said rotary cam, and cam means engageable by said transducer head at a position of the latter near the end of its movement and thereby operative for moving said switch to its said operative position.

13. A dictating machine comprising means for mounting a record medium, a transducer head movable relative to a record medium on said mounting means, means for driving said mounting means and transducer head, signal means, a rotary cam driven by said driving means, a switch for controlling said signal means, said switch having a normal inoperative position and being movable to an operative position relative to said rotary cam, and cam means engageable by said transducer head at a position of the latter near the end of its movement and thereby operative for moving said switch to its said operative position, said switch means being moved progressively, in response to actuation of said cam means, to said operative position, and in such movement moving first to a position wherein the lobes on said rotary cam cause an intermittent closing and opening of the switch means and thereafter a position wherein the rotary cam maintains a constant open-close condition.

14. A dictating machine comprising means for mounting a record medium, a transducer head movable relative to a record medium on said mounting means, means for driving said mounting means and transducer head, signal means, a rotary cam driven by said driving means, a switch for controlling said signal means, said switch having a normal inoperative position and being movable to an operative position relative to said rotary cam, and cam means engageable by said transducer head at a position of the latter near the end of its movement and thereby operative for moving said switch to its said operative position, said switch means having contacts normally spring biased to open position, and being moved progressively, in response to actuation of said cam means, to said operative position, and in said movement moving first to a position wherein the lobes of said rotary cam intermittently close said contacts, and thereafter to a position wherein the contacts remain constantly closed notwithstanding the contour of said rotary cam.

15. A dictating machine comprising means for mounting a record medium, a transducer head movable into and out of a transducing position relative to a record medium on said mounting means, and movable in a path along such record medium, means for driving said mounting means and driving said transducer head along its said path when the latter is in transducing position, first switch means for energizing said transducer head for recording, electric signal means, second switch means, circuit means serially connecting the switch means and signal means, a rotary cam operated by said driving means, means biasing said second switch toward a normal position out of the range of said rotary cam, actuating means operative in response to movement of the transducer head out of transducing position for moving said second switch to position for closure by said rotary cam, and actuating means operative in response to the terminal portion of the movement of said transducer head in its path for moving said second switch to position for closure by said rotary cam.

16. A dictating machine comprising means for mounting a record medium, a transducer head movable into and out of a transducing position relative to a record medium on said mounting means, and movable in a path along such record medium, means for driving said mounting means and driving said transducer head along its said path when the latter is in transducing position, first switch means for energizing said transducer head for recording, electric signal means, second switch means, circuit means serially connecting the switch means and signal means, a rotary cam operated by said driving means, said second switch having spring contact arms yieldingly biased to open position, means biasing said second switch to an inoperative position, actuating means for moving said second switch to move the spring contact arms thereof into position for closure by the rotary cam, said actuating means including a bar extending along the path of movement of the transducer head and rockable for so moving the second switch, and an arm on said transducer head slidable along said bar and swingable for rocking the bar in response to movement of the transducer head out of transducing position, and second actuating means for moving said second switch and moving the spring contact arms thereof into position for closure by the rotary cam, said second actuating means including a cam adjacent the terminal portion of the path of movement of the transducer head and having a camming surface with a component extending linearly of said path, and a camming element on said transducer head engageable with said camming surface pursuant to movement along its said path.

17. A dictating machine comprising rolls for supporting a belt record medium and moving it through a linear path, a transducer head mounted for swinging movement about an axis parallel with said rolls downwardly into a transducing position relative to a record medium on the rolls and upwardly out of said position, a feed screw parallel with said axis and rolls, a screw follower on said transducer head movable into and out of operative engagement with said feed screw pursuant to movement of the transducer head into and out of transducing position respectively, a rotary cam on said feed screw, means for driving at least one of said rolls and said feed screw, a switch for energizing said transducer head for recording, electric signal means, a second switch, circuit means connecting said signal means and switches in series, said second switch being movable into and out of an operative position relative to said rotary cam wherein the rotary cam is operative for closing the switch, actuating means for so moving said second switch, said transducer head having an extension for operating said actuating means in response to movement to transducing position, and cam means on said transducer head and second switch operative for moving the latter to said operative position in response to movement of the transducer head in its said path at the terminal portion thereof.

18. A dictating machine comprising means for removably mounting a belt record medium, a magnetic transducer head mounted for movement into and out of transducing position relative to a record medium on said mounting means, said transducer head when in transducing position being capable of recording and reproducing signals on a record medium on said mounting means and when out of transducing position enabling free and unimpeded movement of a record medium onto and off of said mounting means, a first manual switch for energizing said transducer head for recording, a second manual switch for energizing said transducer head for reproducing, electric signal means, a third switch, circuit means connecting said first and third switch and signal means in series while excluding said second switch therefrom, and means controlled by and operative in response to movement of said transducer head out of transducing position for operating said third switch.

19. A dictating machine comprising means for mounting a record medium, a magnetic transducer head mounted for movement into and out of transducing position relative to a record medium on said mounting means, and for movement relative to such record medium along a predetermined path, means for driving said mounting means and driving said transducer head along said path, a first manual switch for energizing said transducer head for recording, a second manual switch for energizing said transducer head for reproducing, a third manual switch for reversing said driving means, electric signal means, a fourth switch, circuit means connecting said first and fourth switch and signal means in series while excluding said second and third switches therefrom, and means controlled by and operative in response to movement of said transducer head out of transducing position for operating said fourth switch.

20. A dictating machine comprising a machine unit including means for mounting a record medium, a transducer head mounted for movement relative to said mounting means, a microphone unit, means detachably connecting the microphone unit with the machine unit, switch means in said microphone unit for controlling said transducer head, electric audible signal means in said machine unit, means controlled by the switch means in said microphone unit and responsive to a predetermined position of said transducer head for operating said signal means, an electric extension cord operative for establishing detachable connection between said machine unit and microphone unit, electric audible signal means in the end of said extension cord remote from said machine unit, said extension cord connecting said signal means in parallel for actuating in unison.

21. A signalling system and apparatus comprising a machine unit, operating means in said machine unit and driving means therefor, electrical controls for said operating means and driving means, said operating means including a member movable into and out of an operative position, at least one control unit, an electric extension cord detachably interconnecting the machine unit and control unit whereby to position the control unit remotely from the machine unit such as in a different room, electric signal means in said machine unit and in the end of said extension cord remote from the machine unit, a manually actuatable control element in said control unit, circuit means interconnecting said control element and operating means, and circuit means interconnecting said control element and signal means and operative in response to said member being out of operative position when said control element is actuated for operating said signal means.

22. A signalling system and apparatus comprising a machine unit, operating means in said machine unit and driving means therefor, electrical controls for said operating means and driving means, said operating means including a member movable through a predetermined path, at least one control unit, means detachably connecting the control unit with the machine unit, an electric extension cord detachably interconnecting the machine unit and control unit whereby to position the control unit remotely from the machine unit such as in a different room, electric signal means in said machine unit and in the end of said extension cord remote from the machine unit, a manually actuatable control element in said control unit, circuit means interconnecting said control element and operating means, and circuit means interconnecting said control element and signal means and operative in response to said member approaching the end of movement in its said path when said control element is actuated for operating said signal means.

References Cited in the file of this patent

UNITED STATES PATENTS

| | | |
|---|---|---|
| 2,572,596 | Camras | Oct. 23, 1951 |
| 2,681,950 | Owens | June 22, 1954 |
| 2,714,010 | Gruber | July 26, 1955 |
| 2,727,943 | Fitch | Dec. 20, 1955 |